United States Patent [19]
Powers et al.

[11] 4,050,360
[45] Sept. 27, 1977

[54] OIL DAMPED PISTON

[75] Inventors: Harold C. Powers; Robert B. Cambron, both of Peoria, Ill.

[73] Assignee: Caterpillar Tractor Co., Peoria, Ill.

[21] Appl. No.: 615,019

[22] Filed: Sept. 19, 1975

[51] Int. Cl.² ............................ F01B 31/00; F16J 1/02
[52] U.S. Cl. ................................. 92/127; 92/160; 92/187; 92/253; 277/3
[58] Field of Search ................ 92/187, 253, 249, 248, 92/157, 159, 160, 212, 127, 174, 156; 277/24, DIG. 6, 165, 3, 59; 123/193 P

[56] References Cited
U.S. PATENT DOCUMENTS

| | | | |
|---|---|---|---|
| 1,700,894 | 2/1929 | Joyce et al. | 277/24 |
| 2,718,443 | 9/1955 | Mason | 92/160 |
| 2,742,883 | 4/1956 | Smith | 92/159 |
| 3,168,013 | 2/1965 | Williamson | 92/160 X |
| 3,268,235 | 8/1966 | Jacobellis | 277/165 |
| 3,418,001 | 12/1968 | Rentschler et al. | 277/165 |
| 3,521,531 | 7/1970 | Kafsemodel | 92/160 |
| 3,733,973 | 5/1973 | Elsbett et al. | 92/159 |
| 3,835,714 | 9/1974 | van der Aa | 277/165 X |
| 3,906,923 | 9/1975 | Harker | 123/193 P |
| 3,942,806 | 3/1976 | Edlund | 277/24 |

FOREIGN PATENT DOCUMENTS 1,300,746   12/1959   Germany

Primary Examiner—Irwin C. Cohen
Attorney, Agent, or Firm—Wegner, Stellman, McCord, Wiles & Wood

[57] ABSTRACT

An improved oil damped piston for use in internal combustion engines, pumps, compressors, or the like. The piston includes a generally cylindrical piston body having a crown and a depending skirt. A pair of spaced bands of polytetrafluoroethylene are carried by the skirt and each has a surface radially outwardly of the skirt. Each of the band surfaces includes a configuration defining a pumping surface for directing lubricant on a cylinder wall into the space between the band. The oil in the space damps side to side movement of the piston within its cylinder.

1 Claim, 2 Drawing Figures

OIL DAMPED PISTON

BACKGROUND OF THE INVENTION

This invention relates to pistons for internal combustion engines, compressors, pumps, or the like. More specifically, it relates to an improved oil damped piston.

Prior art of possible relevance includes the following U.S. Pat. No. 2,817,562 issued to Fleming et al on Dec. 24, 1957; U.S. Pat. No. 3,528,667 issued to Spaven on Sept. 15, 1970; and U.S. Pat. No. 3,550,988 issued to Schenck et al. on Dec. 27, 1970. In addition, German Auslegeschrift DAS 1300746 of Aug. 7, 1969 to National Research Development Corp. of London, England, is of relevance.

The various components of reciprocating piston mechanisms such as internal combustion engines, compressors, pumps, or the like, must be designed to endure the detrimental effects of high temperatures and extreme stress loads. Much attention has been focused on pistons in particular and they have been improved in a variety of ways. Many of the improvements are focused upon the elimination of or minimization of the effects of scuffing, i.e., metal to metal contact between the piston skirt and the cylinder wall. For example, the above identified U.S. patents concern themselves with the use of polytetrafluoroethylene (PTFE) for this purpose.

In other cases, such as that exemplified by the construction in the above identified German publication, attempts have been made to maintain a constant body of oil interposed between the skirt of the piston and the cylinder side wall to dampen side to side movement of the piston within the cylinder which can result in such detrimental scuffing.

Moreover, in many cases, complex machining methods are employed in the fabrication of pistons. For example, piston skirts are frequently made somewhat elliptical in shape or provided with a "cloverleaf" shape and contoured to allow for differential expansion due to the varying temperatures along the length of the skirt.

SUMMARY OF THE INVENTION

It is a principal object of the invention to provide a new and improved piston assembly for use in reciprocating mechanisms such as internal combustion engines, compressors, pumps, or the like. More specifically, it is an object of the invention to provide such a piston with means for providing oil damping thereof, which means are of simple construction and eliminate the need for complex machining in the piston fabrication procedure.

The exemplary embodiment of the invention achieves the foregoing object in a piston assembly including a generally cylindrical piston body having a crown and a depending skirt. A pair of spaced bands of heat resistant, low friction, polymerized, inert bearing material are carried by the skirt and each has a surface radially outwardly of the skirt for engagement with a cylinder wall. Each of the band surfaces includes a configuration defining a pumping surface for directing lubricant on a cylinder wall into the space between the bands. The lubricant, once between the bands, dampens side to side movement of the piston within a cylinder during operation of the mechanism thereby reducing impact force between the piston skirt and the cylinder to eliminate or effectively minimize scuffing, causing premature wear and failure.

In a highly preferred embodiment of the invention, the bearing material employed is PTFE, that may be fiber filled.

In a highly preferred embodiment of the invention, the piston, near its crown, carries an annular groove for receipt of a conventional oil ring. A conduit is located in the piston body and interconnects the groove and the skirt between the bearing bands. As a consequence, during operation, oil scraped off the cylinder wall by the oil ring will be pumped to the space between the bearing bands to supplement the oil directed thereto by the pumping surfaces on the bands.

According to one construction of the embodiment, the bands are disposed in grooves on the piston skirt.

In a highly preferred embodiment of the invention, the annular space between the bands, which bands are preferably disposed on opposite sides of a cross bore in the body for receipt of a wrist pin, is minimized. For this purpose, means are provided for plugging the ends of the wrist pin receiving cross bore.

Other objects and advantages will become apparent from the following specification taken in connection with the accompanying drawings.

DESCRIPTION OF THE PREFERRED EMBODIMENT

Figure 1:
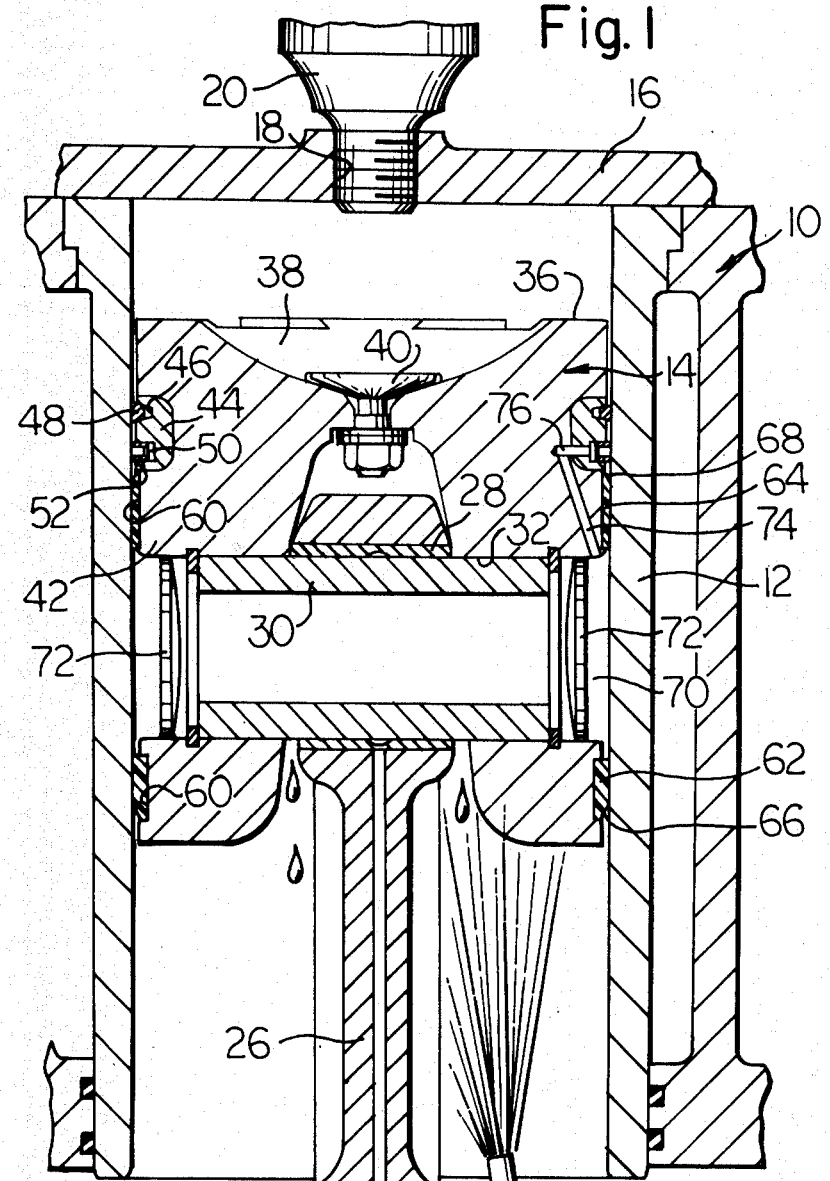
FIG. 1 is a vertical section of a reciprocating mechanism incorporating a piston assembly made according to the invention.

An exemplary embodiment of a piston assembly made according to the invention is illustrated in the drawings in a reciprocating mechanism in the form of a reciprocating engine. However, it is to be understood that the piston may be advantageously employed in other reciprocating mechanisms, such as compressors, pumps, or the like, wherein scuffing poses a wear problem and wherein a liquid lubricant is employed.

The engine includes a block, generally designated 10, having a bore therein supporting a cylinder liner 12 in conventional fashion. The interior surface of the liner 12 defines a cylinder for receipt of a piston, generally designated 14. The cylinder is closed by a head structure 16 which may be of conventional construction. The head 16 is provided with a bore 18 for receipt of an element 20. The element 20 may be a spark plug if the engine is of the spark ignition type, or, alternatively, may form part of a fuel injection system if the mechanism is a diesel.

The mechanism further includes a crank shaft 22 having an eccentric 24 for journalling a piston rod 26. The end of the piston rod 26 remote from the eccentric 24 is journalled by means of bearings 28 on a wrist pin 30 which, in turn, is received in a cross bore 32 extending through the piston 14. As illustrated, suitable lubricating conduits in the crank shaft 22 and the piston rod 26 may be provided along with a lubricant nozzle 34 for splash lubrication of the parts.

The piston 14 may be formed of any suitable material, but aluminum alloy is especially advantageous because of low inertia. The piston 14 includes an upper crown 36 provided with a crater 38 which may be conventional. A heat plug 40 may be employed.

The piston 14 also includes a depending skirt 42, as is well known. Between the skirt 42 and the crown 36, a ring belt insert 44 is disposed in the piston in a conventional fashion. Generally, the ring belt insert 44 will be of cast iron or the like and includes one or more grooves 46 for receipt of a corresponding number of compression rings 48 for engagement with the liner 12. In addition, the ring belt insert will include at least one groove 50 for receipt of a conventional double-edged oil ring 52.

Figure 2:
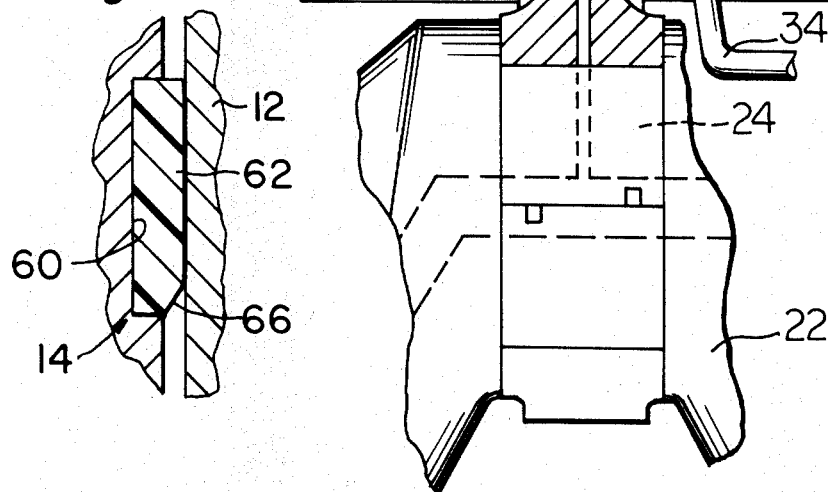
FIG. 2 is an enlarged, fragmentary, sectional view of a portion of the piston assembly.

The skirt 42 of the piston 14 carries a pair of spaced, annular grooves 60, disposed on opposite sides of the cross bore 32, for receipt of respective bands or rings 62 and 64 of a heat resistant, low friction, polymerized, inert bearing material. According to a preferred embodiment, the material employed for the rings 62 and 64 will be a form of polytetrafluoroethylene (PTFE). As can be seen, each of the bands 62 and 64 extends radially outwardly from the associated one of the grooves 60 to engage the inner wall of the liner 12. In addition, the band 62 is provided with a lubricant pumping configuration 66 at its edge adjacent the adjacent end of the piston 14, while the band 64 is provided with a similar lubricant pumping configuration 68. According to a highly preferred embodiment, the configurations 66 and 68 are simple chamfers or tapers. The configuration 66 is perhaps best illustrated in FIG. 2 and it is to be understood that the configuration 68 is identical thereto but is located on the upper edge of the ring 64 rather than the lower edge.

It will be noted that as a result of the disposition of the bands 62 and 64 on the skirt 42, a lubricant receiving space 70 between the bands is defined. The space 70 is annular about the piston skirt.

During operation of the mechanism, reciprocation of the piston 14 will result in the chamfers 66 and 68 pumping oil encountered on the liner wall 12 into the space 70. As a consequence, the lubricating oil will shortly fill the space 70 and will thereby act to dampen side to side movement of the piston within the cylinder, which movement is responsible for detrimental scuffing. In order that the space 70 fill rapidly, so as to insure dampening of the piston almost simultaneously with startup of the mechanism, the space 70 is made as small as possible. Thus, in the area of the cross bore 32, tightfitting expansion plugs 72 are employed at each end of the cross bore 32 to minimize the volume of the space 70 and leakage around the piston pin.

The invention contemplates the use of an auxiliary means for directing lubricant to the space 70. Specifically, a conduit is formed in the piston by means of intersecting bores 74 and 76. The bore 74 opens into the space 70 between the bands 62 and 64, while the intersecting bore 76 opens into the bottom of the groove 50 receiving the oil ring.

As is well known, during operation of such a mechanism, the oil ring 52 will tend to scrape excess lubricating oil from the cylinder wall. Such oil will accumulate in the groove 50 and will be directed via the bores 76 and 74 to the lubricant receiving space 70.

From the foregoing, it will be appreciated that the invention achieves the fabrication of an oil damped piston as a relatively simple construction and eliminates the possibility of the piston skirt contacting the cylinder walls by reason of the provision of the bearing surfaces on the skirt. Wear is minimized through the provision of means for providing for oil damping, which means are simple to fabricate at a very economical rate. The invention thereby allows use of cylindrical pistons eliminating any need for complex machining operations heretofore required in many instances to provide for elliptical or other noncircular shapes in piston skirts.

We claim:

1. A piston assembly for lunbricated internal combustion engines, pumps, compressors, or the like, comprising:
    a. a generally cylindrical piston body having a crown and a depending skirt;
    b. a pair of annular grooves on said skirt, said grooves being spaced from each other to define an annular receiving space;
    c. a ring of heat resistant, low friction, polymerized, inert bearing material in each of said grooves and having a portion extending outwardly therefrom, each ring having a chamfered surface on said portion and remote from said space;
    d. a cross bore in said body for receiving a wrist pin; and
    e. an additional annular groove in said piston body and located between said pair of grooves and said crown, an oil ring disposed in said additional groove, and a conduit in said body interconnecting said additional groove and said annular lubricant receiving space between said pair of grooves.

* * * * *